(No Model.)
G. W. HOOPER.
ELECTRIC RAILWAY TROLLEY.
No. 499,115. Patented June 6, 1893.
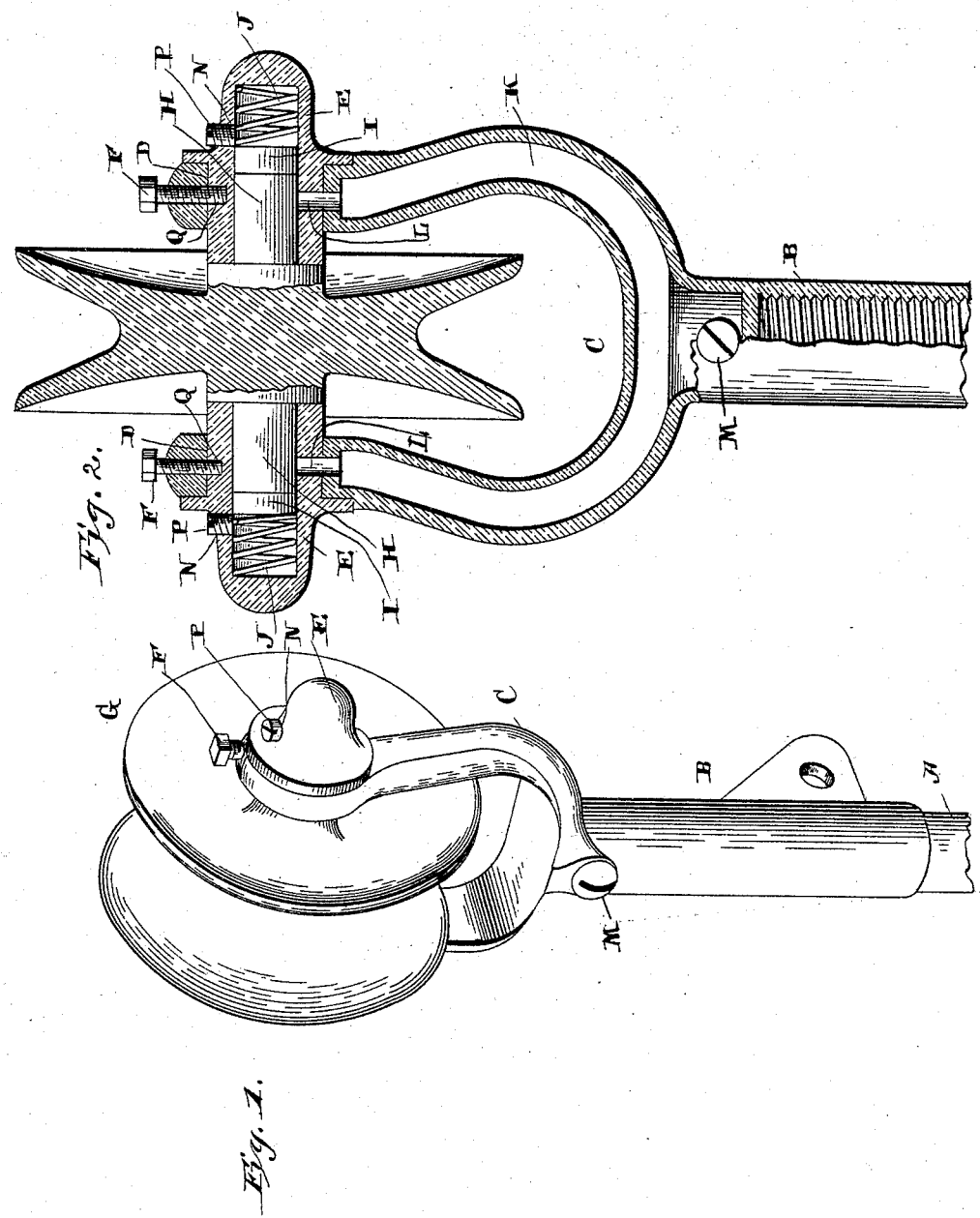
Witnesses
Geo. E. Fruh.
Rot. A. Fitzgerald
Inventor
George W. Hooper
per
Lehmann Pattison Nesbit
attys.

UNITED STATES PATENT OFFICE.

GEORGE WASHINGTON HOOPER, OF ROCHESTER, NEW YORK, ASSIGNOR, BY DIRECT AND MESNE ASSIGNMENTS, OF THREE-FOURTHS TO JOHN A. STEWART, JAMES S. BAKER, AND ALFRED GREEN, OF SAME PLACE.

ELECTRIC-RAILWAY TROLLEY.

SPECIFICATION forming part of Letters Patent No. 499,115, dated June 6, 1893.

Application filed August 10, 1892. Serial No. 442,716. (No model.)

*To all whom it may concern:*

Be it known that I, GEORGE WASHINGTON HOOPER, of Rochester, in the county of Monroe and State of New York, have invented certain new and useful Improvements in Trolleys; and I do hereby declare the following to be a full, clear, and exact description of the invention, such as will enable others skilled in the art to which it pertains to make and use it, reference being had to the accompanying drawings, which form part of this specification.

My invention relates to improvements in trolleys for electric railways, and it consists in the particular construction which will be fully described hereinafter and particularly referred to in the claims.

The primary object of my invention is to provide the trolley wheel with permanent axles at each side thereof which revolve in interchangeable bushings, held in the pole yoke by means of set screws, whereby when one of the bushings becomes worn it can be quickly removed and replaced by another, and to place in these bushings contact points which are held in contact with the ends of the said axles by means of springs.

Another object of my invention is to make the yoke hollow to form an oil chamber, and provide the bushings with openings registering with the openings in the upper ends of the yokes, whereby the oil will flow from the yoke into the bushings, and keep the trolley axles and other frictional parts thereof well oiled.

Figure 1, is a perspective view of a trolley which embodies my invention. Fig. 2, is a vertical section taken longitudinally through the axis of the trolley.

A represents the pole which is of the ordinary construction, and which is preferably provided with a screw threaded upper end which enters a screw threaded socket B formed in the lower end of the yoke C. The upper ends of this yoke C are provided with sockets D, in which the bushings E, are placed, and secured by means of set screws F.

The trolley G is provided with permanent axles H, which extend into the said bushings as plainly illustrated. These bushings are made sufficiently long to permit of the contacts I, and the springs J, being placed between their ends and the outer ends of the said trolley axles. The springs keep the contacts permanently against the ends of the axles H, which makes a steady current. The arms of the yoke are made hollow as shown to form a continuous oil chamber K, from end to end of said yoke the upper ends of the chamber extending into the sockets D, and register with openings L, which are made through the bushings. The lower end of the chamber is closed by means of a screw M, and through this opening oil or grease can be forced into the chamber when the screw is removed. To permit the oil or grease to be placed directly into the bushings if desired, each bushing is provided at its outer end with an opening N, which is closed by means of a screw P.

In order to have the openings L in the bushings register with the upper ends of the oil chamber formed in the yoke, recesses Q are made in the bushings which receive the ends of the screws F. If grease is used as a lubricant, it will be forced into the openings by the thumb or finger, and then when the trolley becomes heated from running, the grease will become melted. When the pole is pulled down for shifting, the oil or melted grease will run into the bushings.

From the above description, it will be seen that I produce a trolley having interchangeable bushings whereby when one becomes worn or injured in any manner it can be readily and quickly removed and another placed therein.

It will be noticed that my trolley is a self oiler, requiring only that the oil be placed therein at night after the car has stopped, and it will run all the next day without requiring oiling.

Having thus described my invention, what I claim, and desire to secure by Letters Patent, is—

1. A trolley comprising a yoke, bushings supported by the yoke, a trolley wheel having an axle revolving within the bushings, and springs within the bushings at opposite ends of the axle, substantially as described.

2. A trolley comprising a yoke, bushings supported by the yoke, a trolley wheel having an axle revolving within said bushings, electrical contacts within the bushings at the ends of the axle, and springs for holding the electrical contacts in engagement with the ends of the axle, substantially as specified.

3. A trolley comprising a yoke having hollow arms communicating at their lower ends to form a continuous chamber from one arm to the other, the upper ends of the arms having socket supporting openings, bushings supported within said openings, a wheel having an axle revolving in said bushings, and registering openings in the socket and in the bushings, substantially as described.

4. A trolley comprising a yoke, bushings having closed outer ends supported by the yoke, a trolley wheel having an axle revolving within said bushings, electrical contacts within the bushings at the ends of the axle, and springs within the bushings engaging the contacts and the closed ends of the bushings, substantially as specified.

In testimony whereof I affix my signature in presence of two witnesses.

GEORGE WASHINGTON HOOPER.

Witnesses:
N. R. STREETER,
J. A. MAXWELL.